(12) United States Patent
Guo et al.

(10) Patent No.: US 12,049,983 B2
(45) Date of Patent: Jul. 30, 2024

(54) LIFE EVALUATING DEVICE AND ROBOT SYSTEM

(71) Applicant: FANUC CORPORATION, Yamanashi (JP)

(72) Inventors: Wei Guo, Yamanashi (JP); Hiroshi Nakagawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 40 days.

(21) Appl. No.: 18/090,988

(22) Filed: Dec. 29, 2022

(65) Prior Publication Data

US 2023/0138726 A1 May 4, 2023

Related U.S. Application Data

(63) Continuation of application No. 15/906,978, filed on Feb. 27, 2018, now Pat. No. 11,578,834.

(30) Foreign Application Priority Data

Mar. 3, 2017 (JP) .................................. 2017-039978
Jul. 20, 2017 (JP) .................................. 2017-140549

(51) Int. Cl.
*F16N 29/04* (2006.01)
*G07C 3/00* (2006.01)

(52) U.S. Cl.
CPC ............ *F16N 29/04* (2013.01); *G07C 3/005* (2013.01); *F16N 2200/10* (2013.01); *F16N 2210/18* (2013.01); *F16N 2260/18* (2013.01)

(58) Field of Classification Search
CPC .. F16N 29/04; F16N 2200/10; F16N 2210/18; F16N 2260/18; G07C 3/005
See application file for complete search history.

(56) References Cited

U.S. PATENT DOCUMENTS

| 4,847,768 A | 7/1989 | Schwartz et al. |
| 5,319,963 A * | 6/1994 | Benford ................. F16H 59/72 374/141 |

(Continued)

FOREIGN PATENT DOCUMENTS

| CN | 102162771 A | 8/2011 |
| CN | 103901184 A | 7/2014 |

(Continued)

OTHER PUBLICATIONS

Chinese Office Action dated Nov. 26, 2018, for Chinese Patent Application No. 201810161880.9.

(Continued)

*Primary Examiner* — Manuel L Barbee
(74) *Attorney, Agent, or Firm* — KARCESKI IP LAW, PLLC

(57) ABSTRACT

A device for estimating a temperature of a lubricant in a transmission that transmits power from a motor to a robot joint includes a thermometer and a processor. The processor includes hardware configured to: receive, as input from the motor, a current value of the motor and calculate, as output, a motor heat value based thereon; receive, as input from the motor and the transmission, a rotating speed of the motor and a frictional torque of the transmission, and calculate, as output, a frictional heat value in the transmission based on the rotating speed of the motor and at least one of the frictional torque of the transmission and at least one coefficient of friction of the transmission; and receive, as input from the thermometer, the room temperature, the frictional heat value, and the motor heat value and estimate, as output, the estimated temperature of the lubricant based thereon.

5 Claims, 7 Drawing Sheets

(56) References Cited

U.S. PATENT DOCUMENTS

| | | |
|---|---|---|
| 2002/0014874 A1 | 2/2002 | Hietmann et al. |
| 2009/0076653 A1 | 3/2009 | Hietmann et al. |
| 2011/0179882 A1 | 7/2011 | Koglin |
| 2012/0249039 A1 | 10/2012 | Usami et al. |
| 2012/0261228 A1 | 10/2012 | Chen et al. |
| 2012/0330580 A1 | 12/2012 | Fruh et al. |
| 2014/0112369 A1 | 4/2014 | Senoo |
| 2015/0019092 A1 | 1/2015 | Morimoto |
| 2015/0306768 A1 | 10/2015 | Liang et al. |
| 2017/0023075 A1 | 1/2017 | Nozu et al. |

FOREIGN PATENT DOCUMENTS

| | | | |
|---|---|---|---|
| CN | 104285137 A | | 1/2015 |
| CN | 105033999 A | | 11/2015 |
| CN | 105701348 A | | 6/2016 |
| CN | 106346465 A | | 1/2017 |
| DE | 10033224 C1 | | 12/2001 |
| DE | 102004056861 A1 | | 6/2006 |
| DE | 102005052745 A1 | | 5/2007 |
| DE | 102013016911 A1 | | 7/2014 |
| DE | 102012112019 B4 | | 6/2016 |
| DE | 102015105536 A1 | | 10/2016 |
| JP | S53130087 A | | 11/1978 |
| JP | H07124889 A | | 5/1995 |
| JP | 2000120848 A | | 4/2000 |
| JP | 2001292586 A | * | 10/2001 |
| JP | 2001292586 A | | 10/2001 |
| JP | 2007309951 A | | 11/2007 |
| JP | 4021354 B2 | | 12/2007 |
| JP | 2009014134 A | | 1/2009 |
| JP | 2011041424 A | | 2/2011 |
| JP | 2011053144 A | | 3/2011 |
| JP | 2011058535 A | | 3/2011 |
| JP | 2012207614 A | | 10/2012 |
| JP | 2012210036 A | | 10/2012 |
| JP | 2013154433 A | | 8/2013 |
| JP | 2013241975 A | | 12/2013 |
| JP | 2020008472 A | | 1/2020 |
| WO | 2013160055 A1 | | 10/2013 |

OTHER PUBLICATIONS

German Office Action dated Apr. 25, 2019, for German Patent Application No. 102018104400.3.
U.S. Appl. No. 16/444,869, filed Jun. 18, 2019.
German Office Action dated Jul. 6, 2023, for German Patent Application No. 102018010411.8.

\* cited by examiner

FIG. 7

| FIRST AXIS GREASE REPLACEMENT | ESTIMATED | 08/2018 |
| | RESIDUAL LIFE | 34.2% |
| SECOND AXIS GREASE REPLACEMENT | ESTIMATED | 06/2018 |
| | RESIDUAL LIFE | 15.3% |
| THIRD AXIS GREASE REPLACEMENT | ESTIMATED | 07/2018 |
| | RESIDUAL LIFE | 24.2% |

LIFE EVALUATING DEVICE AND ROBOT SYSTEM

CROSS-REFERENCE TO RELATED APPLICATIONS

This application is a Continuation patent application of U.S. patent application Ser. No. 15/906,978, filed on Feb. 27, 2018, which is based on and claims priority to Japanese Patent Application No. 2017-039978, filed on Mar. 3, 2017, and to Japanese Patent Application No. 2017-140549, filed on Jul. 20, 2017, the entire contents of all of which are incorporated herein by reference.

FIELD OF THE INVENTION

The present invention relates to a life evaluating device and a robot system.

BACKGROUND OF THE INVENTION

There has been known a life evaluating device that identifies a coefficient of friction of a transmission mechanism from a motor current and motor speed, estimates temperature of grease from a relation between a coefficient of friction and temperature of the grease determined in advance, corrects input speed of the transmission mechanism taking into account the estimated temperature of the grease, and evaluates a life of the grease from the corrected input speed (see, for example, the Publication of Japanese Patent No. 4021354).

SUMMARY OF THE INVENTION

The present invention provides solutions explained below.

An aspect of the present invention is directed to a life evaluating device that evaluates a life of a lubricant in a machine including at least one motor and a transmission mechanism that is lubricated by the lubricant and transmits power of the at least one motor to a movable unit. The life evaluating device includes: a motor-heat-value calculating unit that calculates a motor heat value on the basis of a current value of the at least one motor; a frictional-heat-value calculating unit that calculates a frictional heat value in the transmission mechanism on the basis of rotating speed of the at least one motor and a coefficient of friction of the transmission mechanism; a lubricant-temperature estimating unit that estimates temperature of the lubricant on the basis of the frictional heat value calculated by the frictional-heat-value calculating unit and the motor heat value calculated by the motor-heat-value calculating unit; and a life estimating unit that estimates the life of the lubricant on the basis of the temperature of the lubricant estimated by the lubricant-temperature estimating unit.

Another aspect of the present invention provides a robot system including: a robot including the at least one motor including one or more motors, one or more movable units, and the one or more transmission mechanisms that are lubricated by the lubricant and transmit power of the motors to the movable units; a control device that controls the motors of the robot; and any one of the life evaluating devices described above.

BRIEF DESCRIPTION OF THE DRAWINGS

FIG. 7 is a diagram showing a display example of an estimated replacement date and a residual life output by the life evaluating device shown in FIG. 6.

DESCRIPTION OF EMBODIMENTS OF THE INVENTION

A life evaluating device 12 and a robot system 1 according to an embodiment of the present invention are explained below with reference to the drawings.

Figure 1:
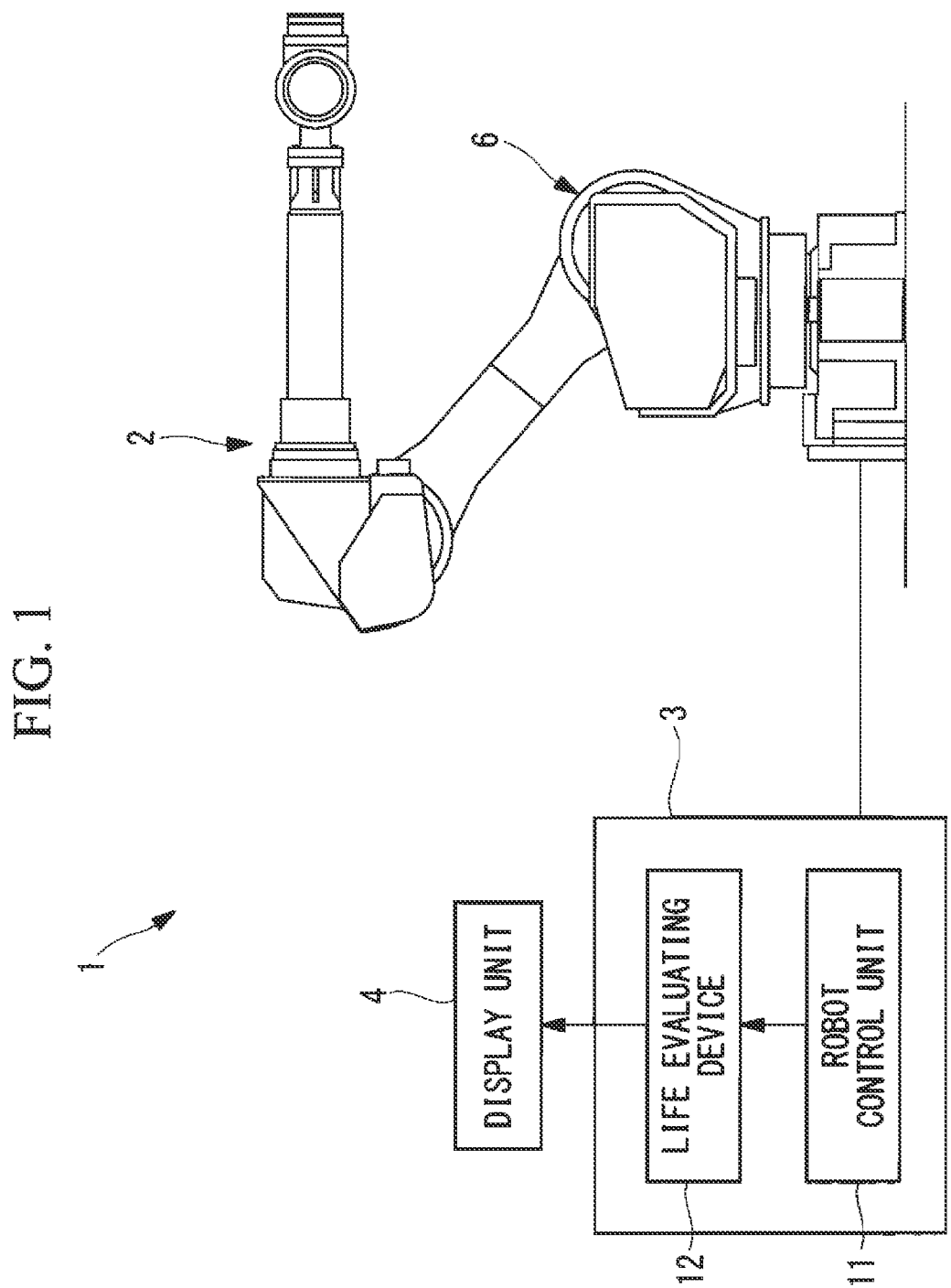
FIG. 1 is an overall configuration diagram showing a robot system according to an embodiment of the present invention.

The robot system 1 according to this embodiment includes, as shown in FIG. 1, a robot 2, a control device 3 that controls the robot 2, and a display unit 4 connected to the control device 3.

The robot 2 is a robot including one or more links (movable units) 5 and one or more joints. In an example shown in FIG. 1, a six-axis articulated robot can be illustrated as the robot 2.

Figure 2:
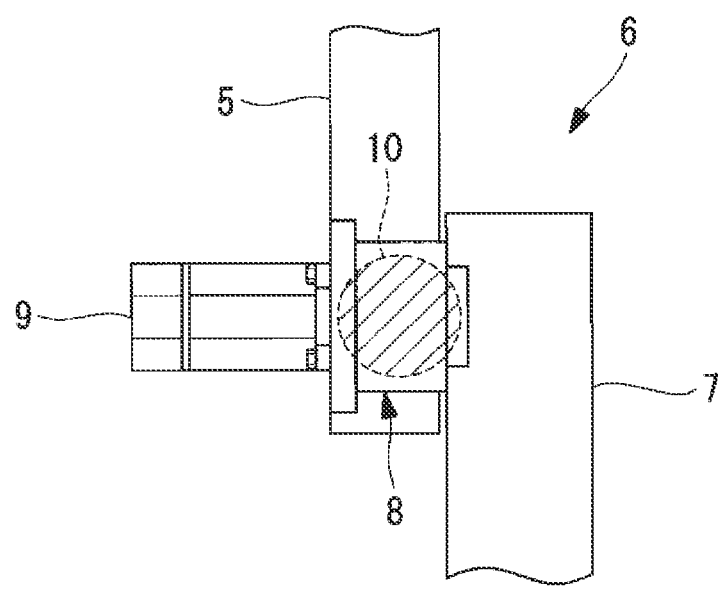
FIG. 2 is a partial longitudinal sectional view showing an example of a joint portion of a robot included in the robot system shown in FIG. 1.

An example of a joint portion 6 of the robot 2 is shown in FIG. 2. The joint portion 6 includes a base 7, a link 5 supported to be capable of swinging around an axis with respect to the base 7, a reducer (a transmission mechanism) 8 disposed between the link 5 and the base 7, and a motor 9 that generates power input to the reducer 8.

Grease (a lubricant) 10 is filled inside the reducer 8 to lubricate gears and bearings configuring the reducer 8.

When the motor 9 is actuated, rotation of the motor 9 is reduced by the reducer 8. The link 5 is rotated with respect to the base 7.

The control device 3 includes a robot control unit (a control device) 11 that controls the robot 2 and the life evaluating device 12 according to this embodiment that evaluates the life of the grease 10.

Figure 3:
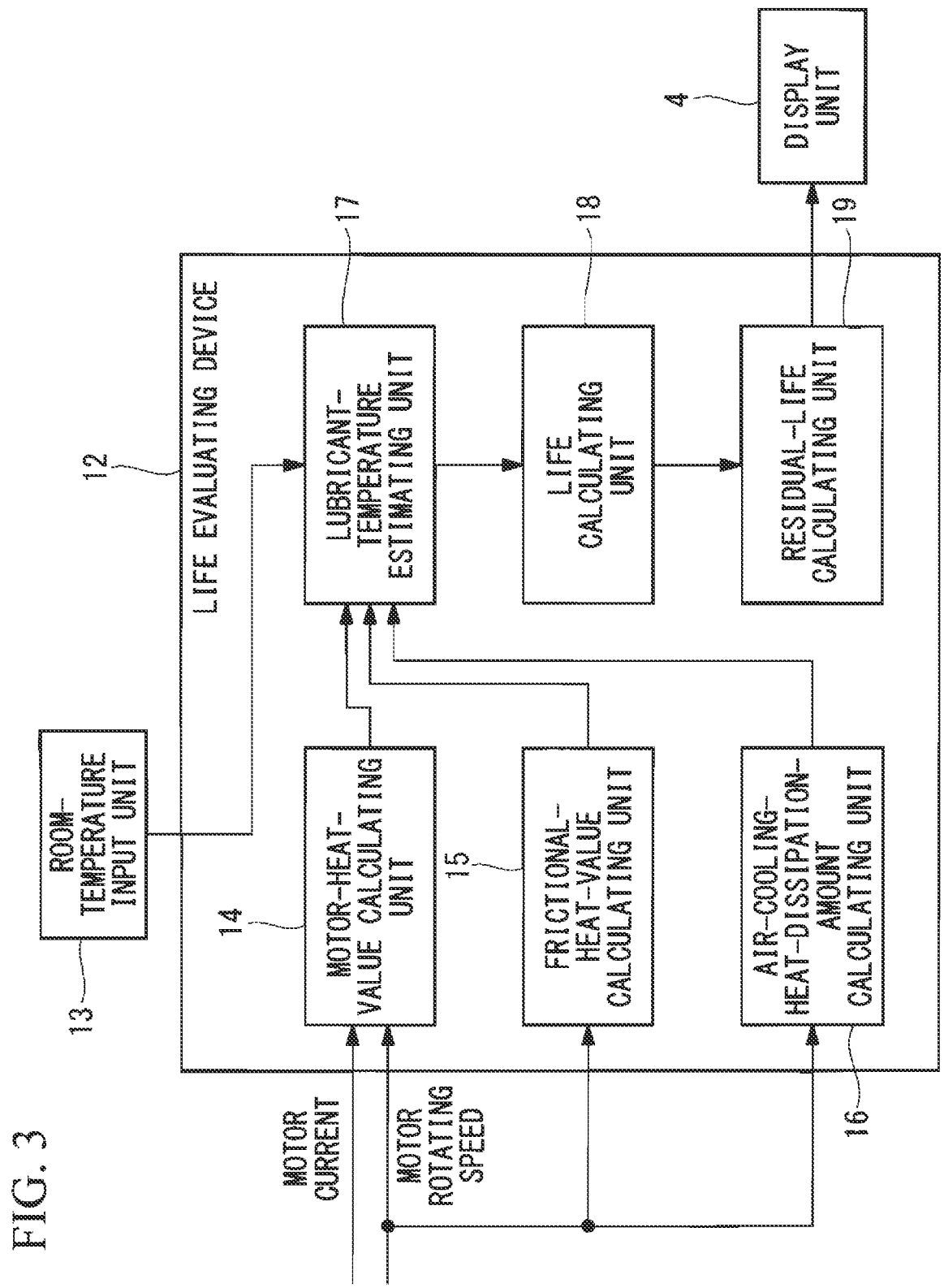
FIG. 3 is a block diagram showing a life evaluating device according to the embodiment of the invention included in the robot system shown in FIG. 1.

The life evaluating device 12 includes, as shown in FIG. 3, a room-temperature input unit 13 that inputs a room temperature, a motor-heat-value calculating unit 14 that calculates a motor heat value, a frictional-heat-value calculating unit 15 that calculates a frictional heat value in the reducer 8, an air-cooling-heat-dissipation-amount calculating unit 16, a lubricant-temperature estimating unit 17 that estimates temperature of the grease 10 on the basis of heat quantities calculated by the calculating units 14, 15, and 16, and a life calculating unit (a life estimating unit) 18 that calculates life of the grease 10 on the basis of the estimated temperature.

The room temperature may be manually input by an operator or may be detected by a temperature sensor.

The motor-heat-value calculating unit 14 is configured to calculate a motor heat value according to Equation (1) on the basis of a motor state amount input from the robot control unit 11, that is, a current value of the motor 9 (a motor current value) and rotating speed of the motor 9 (motor rotating speed).

$$W_1 = A_1 \times I_M^2 + (A_2 \times S_M + A_3 \times S_M^2) \tag{1}$$

where, $W_1$ represents a motor heat value, $A_1$, $A_2$, and $A_3$ represent coefficients, $I_M$ represents a motor current value, and $S_M$ represents motor rotating speed.

In Equation (1), a first term of a right side indicates a copper loss in the motor 9 and a second term indicates an iron loss.

The frictional-heat-value calculating unit 15 is configured to calculate a frictional heat value according to Equation (2) on the basis of motor state amounts input from the robot control unit 11, that is, frictional torque and motor rotating speed.

$$W_2 = T \times S_M = (B_1 + B_2 \times T_M + B_3 \times S_M) \times S_M \tag{2}$$

where, $W_2$ represents a frictional heat value, T represents frictional torque, $B_1$, $B_2$, and $B_3$ represent coefficients of friction identified in advance, and $T_M$ represents torque necessary when driving the link 5 of the robot 2 when friction is absent.

The torque $T_M$ is calculated by, in general, a publicly-known calculation method such as a Lagrangian method or a Newton-Euler method using the position, the acceleration, mass information, and the like of the link 5.

The air-cooling-heat-dissipation-amount calculating unit 16 calculates an air cooling heat dissipation amount generated because relative speed is generated between the reducer 8 and the ambient air when the reducer 8 itself moves in the air according to driving of the robot 2. The air-cooling-heat-dissipation-amount calculating unit 16 is configured to calculate moving speed of the robot 2 in the position of the reducer on the basis of the rotating speed of the motor 9 input from the robot control unit 11 and calculate an air cooling heat dissipation amount according to Equation (3) on the basis of the calculated moving speed.

$$W_3 = C_1 \times S_R \tag{3}$$

where, $W_3$ represents an air cooling heat dissipation amount, $C_1$ represents a value calculated by a sum of the motor heat value $W_1$ and the frictional heat value $W_2$, and $S_R$ represents moving speed of the robot 2 in the position of the reducer 8.

The lubricant-temperature estimating unit 17 is configured to estimate temperature of the grease 10 according to Equation (4).

$$T = T_0 + D_1 \times (\Sigma E_i \times W_{1i})^{D_5} + D_2 \times (\Sigma F_i \times W_{2i})^{D_6} + D_3 \times W_3 + D_4 \times W_4 \tag{4}$$

where, T represents an estimated temperature of the grease 10, $T_0$ represents a room temperature, i represents an axis affecting a target axis lubricant temperature including a target axis, $D_1$, $D_2$, $D_3$, $D_4$, $D_5$, and $D_6$ represent coefficients identified by executing operations in various patterns in experiments in advance and acquiring data of grease temperatures, room temperatures, heat values, moving speeds of the reducer 8, and heat values of another heat generation source in the respective patterns, $W_4$ represents a heat value of the other heat generation source, $E_i$ represents a coefficient of a motor heat value $W_{1i}$, and $F_i$ represents a coefficient of a frictional heat value $W_{2i}$.

As the other heat generation source, another joint or device near the grease 10 can be illustrated.

In addition to Equation (4), heat radiation may be taken into account.

In this embodiment, the estimated temperature T of the grease 10 is calculated by Equation (4) during the operation of the robot 2 and is set the same as the room temperature when the robot 2 is stopped.

As an example, when axes of the robot 2, which is a six-axis articulated robot, are represented as a J1 axis, a J2 axis, a J3 axis, a J4 axis, a J5 axis, and a J6 axis, if the motors 9 and the reducer 8 of the J4 axis, the J5 axis, and the J6 axis are densely packed and affect one another, the estimated temperature T of the grease 10 targeting the J6 axis is estimated by Equation (8).

$$T = T_0 + D_1 \times (E_4 \times W_{14} + E_5 \times W_{15} + E_6 \times W_{16})^{D_5} + D_2 \times (F_4 \times W_{24} + F_5 \times W_{25} + F_6 \times W_{26})^{D_6} + D_4 \times W_3 + D_4 \times W_4 \tag{8}$$

$E_4$ is a coefficient of a motor heat value $W_{14}$ of the J4 axis, $E_5$ is a coefficient of a motor heat value $W_{15}$ of the J5 axis, $E_6$ is a coefficient of a motor heat value $W_{16}$ of the J6 axis, $F_4$ is a coefficient of a frictional heat value $W_{24}$ of the J4 axis, $F_5$ is a coefficient of a frictional heat value $W_{25}$ of the J5 axis, and $F_6$ is a coefficient of a frictional heat value $W_{26}$ of the J6 axis.

In Equation (8), a case is illustrated in which the J1 axis, the J2 axis, and the J3 axis do not affect the J6 axis and the J4 axis and the J5 axis affect the J6 axis. However, when the J1 axis, the J2 axis, and the J3 axis also affect the J6 axis, $W_{11}$, $W_{12}$, $W_{13}$, $W_{21}$, $W_{22}$, $W_{23}$, $E_1$, $E_2$, $E_3$, $F_1$, $F_2$, and $F_3$ are additionally written.

In Equation (8), the case is illustrated in which the J4 axis and the J5 axis affect the J6 axis. However, when the J4 axis and the J5 axis do not affect the J6 axis like the J1 axis, the J2 axis, and the J3 axis, $W_{14}$, $W_{15}$, $W_{24}$, and $W_{25}$ (or $E_4$, $E_5$, $F_4$, and $F_5$) are 0.

Figure 4:
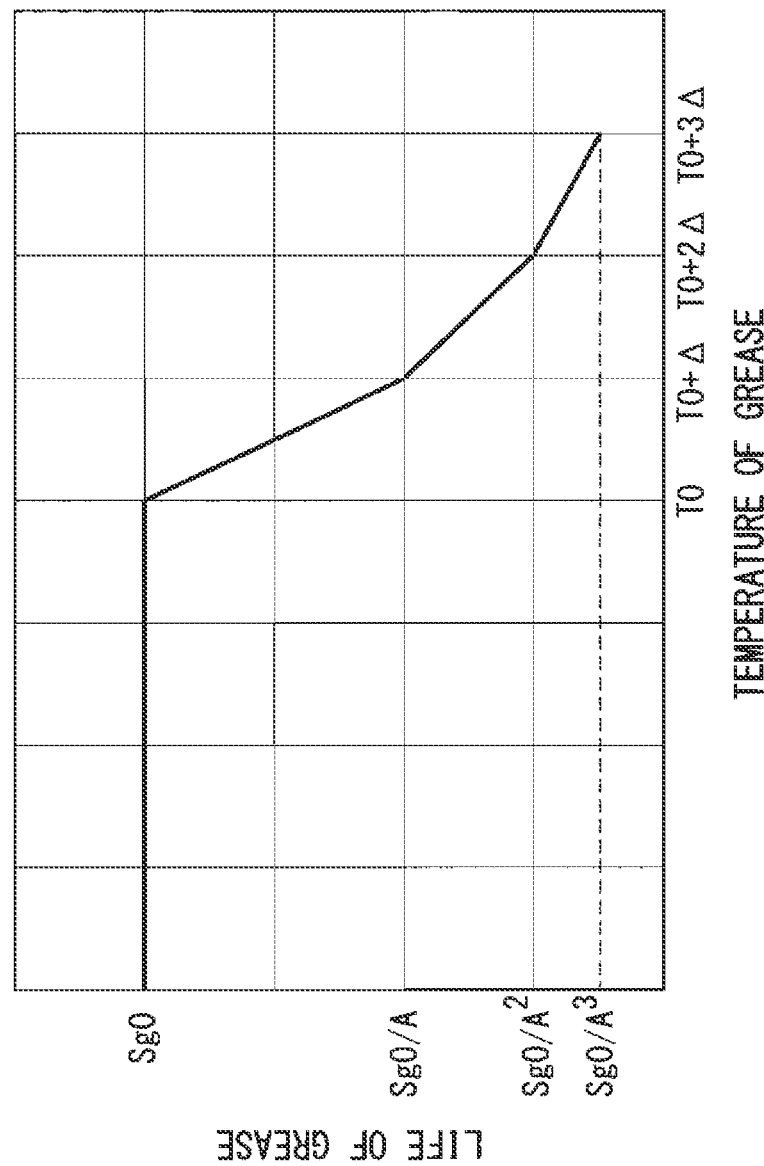
FIG. 4 is a graph showing a relation between temperature of grease and a life of the grease in the case in which the temperature is maintained.

The temperature and the life of the grease 10 have a relation shown in FIG. 4. That is, when the temperature of the grease 10 is T0 or less, the life of the grease 10 is a fixed rated life Sg0. On the other hand, when the temperature is higher than T0, the life of the grease 10 exponentially decreases. Therefore, it is possible to calculate a life use amount using Equation (5) according to an estimated temperature and an estimated time.

$$Sg = \int A^k dt \tag{5}$$

where, Sg represents a life use amount of the grease 10, A represents a constant, k is $(T-T0)/A$ when $T > T0$ and is 0 when $T \leq T0$, and A represents a difference from temperature T0 at which the life use amount is A times.

In Equation (5), both of a time during the operation of the robot 2 and a time during the stop of the robot 2 are calculated and totaled.

The life calculating unit 18 is configured to calculate a life use amount of the grease 10 from the estimated temperature of the grease 10 using Equation (5).

In this embodiment, as shown in FIG. 3, the life evaluating device 12 includes a residual-life calculating unit 19.

The residual-life calculating unit 19 is configured to calculate a residual life using Equation (6).

$$\text{Residual life} = (1 - Sg/Sg0) \times 100\% \tag{6}$$

The display unit 4 may display the residual life itself calculated by the residual-life calculating unit 19 or may display a warning when the calculated residual life is smaller than a preset threshold.

With the life evaluating device 12 according to this embodiment configured as explained above and the robot system 1 including the life evaluating device 12, the temperature of the grease 10, which lubricates the reducer 8, is estimated on the basis of not only the coefficient of friction in the reducer 8 but also the motor heat value. Therefore, there is an advantage that the temperature of the grease 10 is accurately estimated and it is possible to accurately evaluate the life of the grease 10.

The motor heat value is calculated on the basis of the motor current and the motor rotating speed. Therefore, there is an advantage that, when heat generation by the motor rotating speed is large, it is possible to accurately calculate the motor heat value and it is possible to accurately evaluate the life of the grease 10. When the heat value by the rotating speed of the motor 9 is small, the iron loss of the second term of the right side in Equation (1) may be omitted.

According to this embodiment, the temperature of the grease 10 is estimated also taking into account the air cooling heat dissipation value with which the reducer 8 disposed in the link 5 and moved is cooled by the movement. Consequently, it is possible to more accurately estimate temperature of the grease 10 and it is possible to accurately evaluate the life of the grease 10.

According to this embodiment, the calculated life use amount is not displayed but the residual life is calculated and displayed. Therefore, there is an advantage that the operator can confirm a replacement time in advance.

Figure 5:
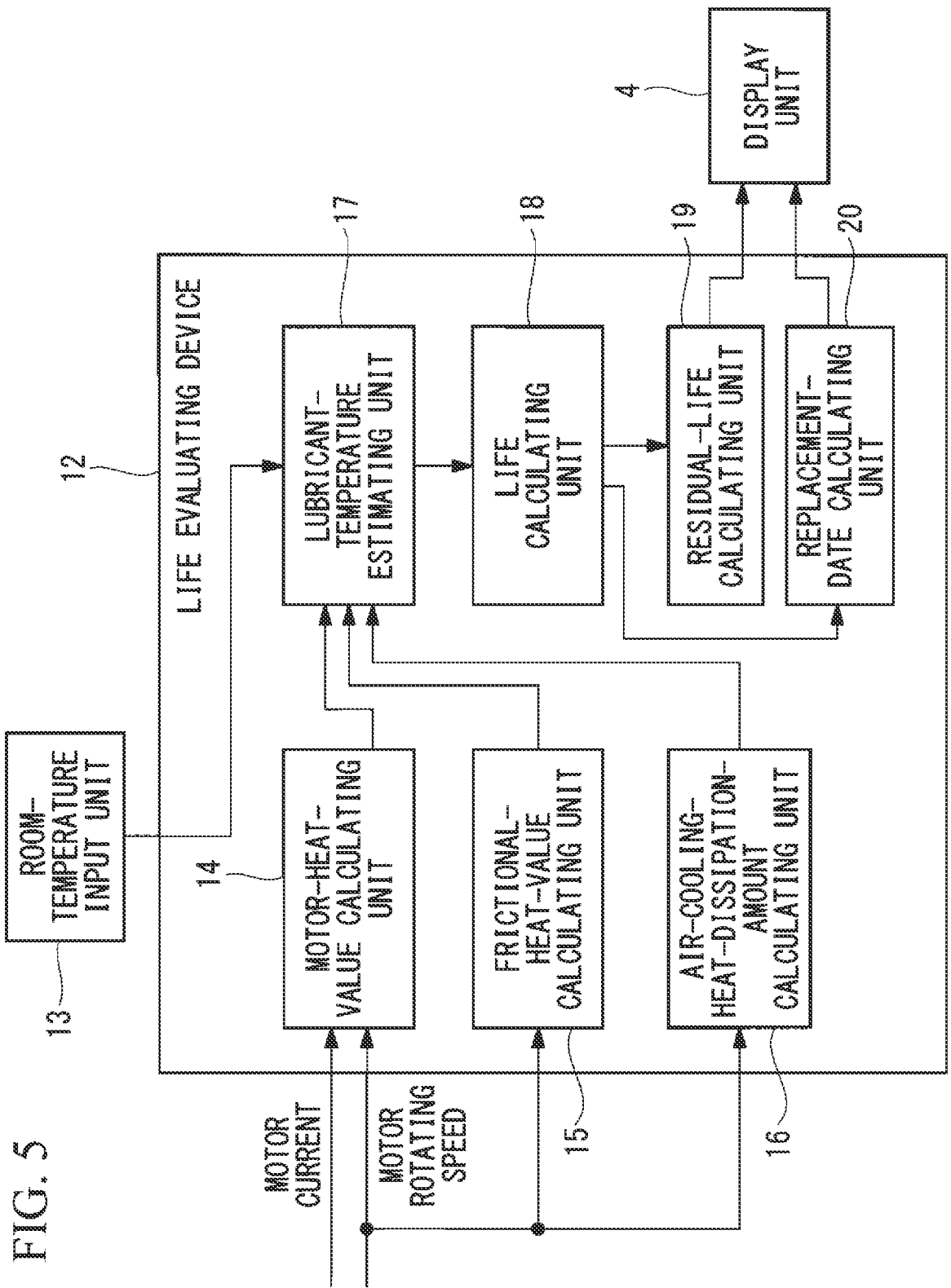
FIG. 5 is a block diagram showing a modification of the life evaluating device shown in FIG. 3.

Note that, in this embodiment, the residual life of the grease 10 is calculated and displayed. However, instead of this or in addition to this, as shown in FIG. 5, the life evaluating device 12 may include a replacement-date calculating unit 20 that calculates a replacement date of the grease 10.

Figure 6:
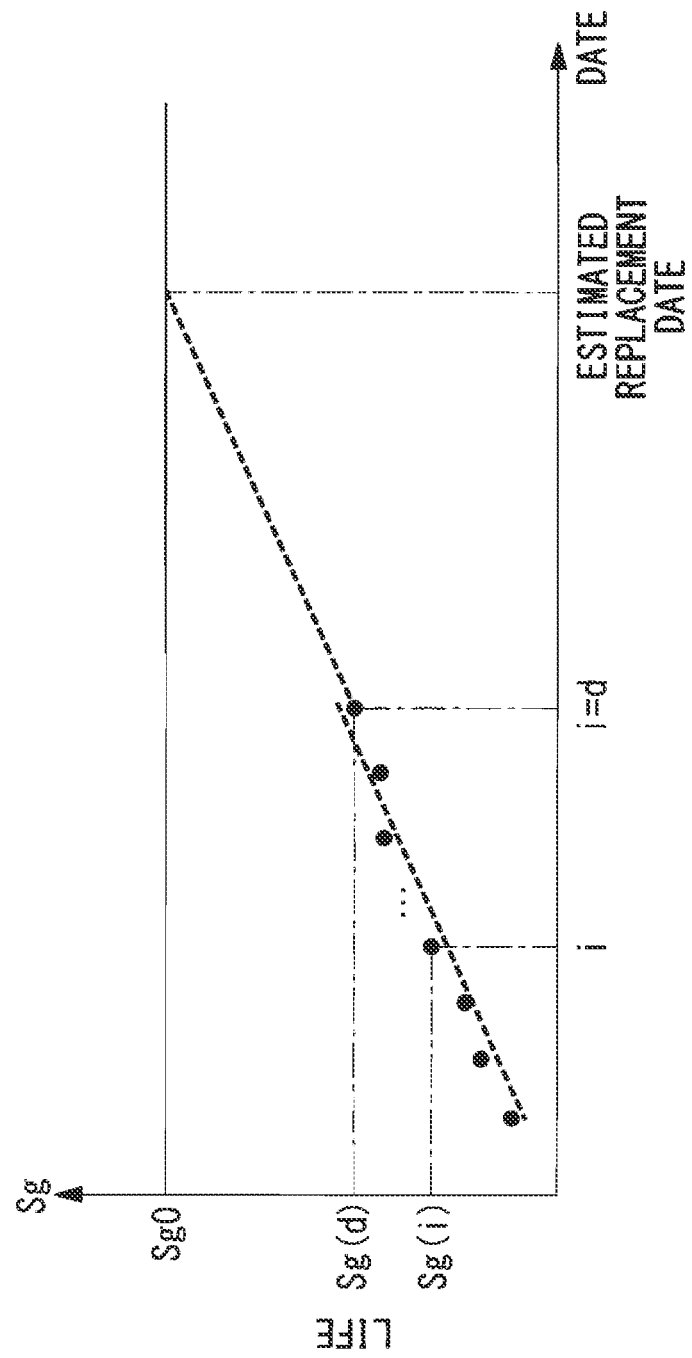
FIG. 6 is a graph for explaining a calculation method for a replacement date by a replacement-date calculating unit for the grease in the modification of the life evaluating device shown in FIG. 3.

As shown in FIG. 6, the replacement-date calculating unit 20 calculates, using data of a life use amount of the grease 10 in the closest several days, an increase ratio of an integrated value of the life use amount using a method of least squares according to Equation (7) and predicts, using the calculated increase ratio, a time when the integrated value of the life use amount reaches a rated life. As an example, a calculation formula for calculating a recommended replacement date (an estimated replacement date) using a life use amount integrated value in the closest twenty days is indicated by Equation (7) below.

Recommended replacement date =

$$d + (20000 - Sg(d)) \times \frac{20 \times \sum_{i=d-19}^{d} i^2 - \left(\sum_{i=d-19}^{d} i\right)^2}{20 \times \sum_{i=d-19}^{d} i \times Sg(i) - \sum_{i=d-19}^{d} i \times \sum_{i=d-19}^{d} Sg(i)} \quad (7)$$

where, d represents a date when the latest Sg is calculated.

That is, when a use state of the robot 2 in the closest several days is continued as it is, a date when the life of the grease 10 is exhausted is predicted. The date is displayed on the display unit 4 for each of joints as shown in FIG. 7.

Since the estimated replacement date calculated by the replacement-date calculating unit 20 is displayed on the display unit 4 in this way, there is an advantage that it is possible to more clearly recognize a replacement time. In Equation (7), the method of least squares is illustrated. However, a calculation method is not limited to this. Any other approximation calculation method may be adopted.

Note that, in this embodiment, the grease 10 is illustrated as the lubricant that lubricates the reducer 8. However, the life evaluating device 12 may be applied to any lubricant such as oil. An axis configuration of the robot 2 is not limited to the vertical articulated type shown in FIG. 1. The life evaluating device 12 may be applied to the robot system 1 including the robot 2 having any other axis configuration.

As a result, the above-described embodiment leads to the following aspects.

An aspect of the present invention is directed to a life evaluating device that evaluates a life of a lubricant in a machine including at least one motor and a transmission mechanism that is lubricated by the lubricant and transmits power of the at least one motor to a movable unit. The life evaluating device includes: a motor-heat-value calculating unit that calculates a motor heat value on the basis of a current value of the at least one motor; a frictional-heat-value calculating unit that calculates a frictional heat value in the transmission mechanism on the basis of rotating speed of the at least one motor and a coefficient of friction of the transmission mechanism; a lubricant-temperature estimating unit that estimates temperature of the lubricant on the basis of the frictional heat value calculated by the frictional-heat-value calculating unit and the motor heat value calculated by the motor-heat-value calculating unit; and a life estimating unit that estimates the life of the lubricant on the basis of the temperature of the lubricant estimated by the lubricant-temperature estimating unit.

According to the aspect, the motor heat value is calculated by the motor-heat-value calculating unit on the basis of the current value of the motor. The frictional heat value in the transmission mechanism is calculated by the frictional-heat-value calculating unit on the basis of the coefficient of friction of the transmission mechanism and the rotating speed of the motor. The temperature of the lubricant is estimated by the lubricant-temperature estimating unit on the basis of the calculated motor heat value and the calculated frictional heat value. The life of the lubricant is estimated by the life estimating unit on the basis of the estimated temperature.

Compared with the conventional life evaluating device that estimates temperature of the lubricant on the basis of only the coefficient of friction, since the heat value of the motor greatly contributing to a temperature rise of the lubricant is taken into account, it is possible to accurately evaluate the life of the lubricant.

In the aspect, the motor-heat-value calculating unit may calculate the motor heat value on the basis of the current value of the at least one motor and the rotating speed of the at least one motor.

Consequently, compared with when the motor heat value is calculated on the basis of only the current value of the motor, when heat generation by the rotating speed of the motor is large, it is possible to accurately calculate the motor heat value.

In the aspect, the life evaluating device may include an air-cooling-heat-dissipation-amount calculating unit that calculates an air cooling heat dissipation amount on the basis of moving speed of the transmission mechanism. The lubricant-temperature estimating unit may estimate the temperature of the lubricant on the basis of the air cooling heat dissipation amount calculated by the air-cooling-heat-dissipation-amount calculating unit.

In this way, when the transmission mechanism is disposed in the movable unit and moved, forced air cooling is carried out by the movement. Therefore, the air cooling heat dissipation amount is calculated by the air-cooling-heat-dissipation-amount calculating unit on the basis of the moving speed of the transmission mechanism, and the temperature of the lubricant is estimated by the lubricant-temperature estimating unit on the basis of the air cooling heat dissipation amount. Consequently, it is possible to estimate temperature of the lubricant more conforming to a real machine. It is possible to accurately evaluate the life of the lubricant.

In the aspect, the life evaluating device may include a residual-life calculating unit that calculates a residual life on the basis of the life estimated by the life estimating unit.

In this way, the residual life is calculated by the residual-life calculating unit. Therefore, it is possible to confirm a replacement time in advance.

In the aspect, the life evaluating device may include a replacement-date calculating unit that calculates an estimated replacement date on the basis of the life estimated by the life estimating unit.

In this way, it is possible to more clearly recognize the replacement time according to the estimated replacement date calculated by the replacement-date calculating unit.

In the aspect, the lubricant-temperature estimating unit may estimate the temperature of the lubricant according to an equation described below.

$$T = T_0 + D_1 \times (\Sigma E_i \times W_{1i})^{D5} + D_2 \times (\Sigma F_i \times W_{2i})^{D6} + D_3 \times W_3 + D_4 \times W_4$$

where, T represents an estimated temperature of the lubricant, $T_0$ represents a room temperature, i represents an axis affecting a target axis lubricant temperature including a target axis, $D_1$, $D_2$, $D_3$, $D_4$, $D_5$, and De represent coefficients identified by executing operations in various patterns in experiments in advance and acquiring data of the lubricant temperatures, room temperatures, heat values, moving speeds of a reducer, and heat values of another heat generation source in the respective patterns, $W_3$ represents an air cooling heat dissipation amount, $W_4$ represents a heat value of the other heat generation source, $E_i$ represents a coefficient of the motor heat value $W_{1i}$, and $F_i$ represents a coefficient of the frictional heat value $W_{2i}$.

Another aspect of the present invention provides a robot system including: a robot including the at least one motor including one or more motors, one or more movable units, and the one or more transmission mechanisms that are lubricated by the lubricant and transmit power of the motors to the movable units; a control device that controls the motors of the robot; and any one of the life evaluating devices described above.

According to the present invention, there is an effect that it is possible to accurately evaluate the life of the lubricant.

What is claimed is:

1. A device for estimating a temperature of a lubricant in a transmission that transmits power from a motor to a robot joint, the device comprising:
   a thermometer to generate a room temperature for the motor; and
   a processor, connected to the motor, the transmission, and the thermometer, comprising hardware,
   wherein the processor is configured to:
   receive, as input from the motor, a current value of the motor and calculate, as output, a motor heat value based thereon;
   receive, as input from the motor and the transmission, a rotating speed of the motor and a frictional torque of the transmission, and calculate, as output, a frictional heat value in the transmission based on the rotating speed of the motor and at least one of the frictional torque of the transmission and at least one coefficient of friction of the transmission; and
   receive, as input from the thermometer, the room temperature, the frictional heat value, and the motor heat value and estimate, as output, the estimated temperature of the lubricant based thereon.

2. The device according to claim 1, wherein the calculating of the motor heat value also receives, as input, the rotating speed of the motor and calculates, as output, the motor heat value based on the current value of the motor and the rotating speed of the motor.

3. The device according to claim 2, wherein the processor is further configured to receive, as input, a moving speed of the transmission and calculate, as output, an air cooling heat dissipation amount based thereon, and
   wherein the estimated temperature of the lubricant is estimated also based on the air cooling heat dissipation amount.

4. The device according to claim 3, wherein the estimating of the estimated temperature of the lubricant according to an equation:

$$T = T_0 + D_1 \times (\Sigma E_i \times W_{1i})^{D5} + D_2 \times (\Sigma F_i \times W_{2i})^{D6} + D_3 \times W_3 + D_4 \times W_4$$

where, T represents an estimated temperature of the lubricant, $T_0$ represents a room temperature, i represents an axis affecting a target axis lubricant temperature including a target axis, $D_1$, $D_2$, $D_3$, $D_4$, $D_5$, and De represent coefficients identified by executing operations in various patterns in experiments in advance and acquiring data of the lubricant temperatures, room temperatures, heat values, moving speeds of a reducer, and heat values of another heat generation source in the respective patterns, $W_3$ represents an air cooling heat dissipation amount, $W_4$ represents a heat value of the other heat generation source, $E_i$ represents a coefficient of the motor heat value $W_{1i}$, and $F_i$ represents a coefficient of the frictional heat value $W_{2i}$.

5. A robot system comprising:
   a robot;
   the motor, wherein the motor comprises at least one motor;
   the robot joint, wherein the robot joint comprises at least one robot joint;
   the transmission, wherein the transmission comprises at least one transmission;
   a control device that controls the motor of the robot; and
   the device according to claim 1.

* * * * *